(12) United States Patent
Lei et al.

(10) Patent No.: US 11,076,417 B2
(45) Date of Patent: Jul. 27, 2021

(54) DOWNLINK TRANSMISSION SCHEDULING FOR USER EQUIPMENTS ENABLING DEVICE-TO-DEVICE COMMUNICATIONS

(71) Applicant: Microsoft Technologly Licensing, LLC, Redmond, WA (US)

(72) Inventors: Haipeng Lei, Beijing (CN); Zhi Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 14/503,266

(22) Filed: Sep. 30, 2014

(65) Prior Publication Data

US 2016/0037551 A1 Feb. 4, 2016

(30) Foreign Application Priority Data

Jul. 31, 2014 (CN) .......................... 201410370921.7

(51) Int. Cl.
*H04W 72/12* (2009.01)
*H04L 5/14* (2006.01)
(Continued)

(52) U.S. Cl.
CPC ........... *H04W 72/1273* (2013.01); *H04L 5/14* (2013.01); *H04W 72/02* (2013.01); *H04W 76/14* (2018.02); *H04W 72/042* (2013.01)

(58) Field of Classification Search
CPC ........... H04W 72/1273; H04W 76/023; H04W 72/02; H04W 72/04; H04W 76/14;
(Continued)

(56) References Cited

U.S. PATENT DOCUMENTS 8,374,212 B2 2/2013 Charbit et al.
8,737,276 B2 5/2014 Madan et al.
(Continued)

FOREIGN PATENT DOCUMENTS

CN 102461297 A 5/2012
CN 103209487 A 7/2013
(Continued)

OTHER PUBLICATIONS

"International Search Report & Written Opinion for PCT Patent Application No. PCT/US2015/042766", dated Oct. 19, 2015, Filed Date: Jul. 30, 2015, 10 Pages.
(Continued)

*Primary Examiner* — Charles C Jiang
*Assistant Examiner* — Voster Preval
(74) *Attorney, Agent, or Firm* — Ray Quinney & Nebeker; Thomas M. Hardman; Gregg W. Wisdom

(57) ABSTRACT

This disclosure generally relates to downlink transmission scheduling for D2D UE based on subframe pattern. In one embodiment, the D2D UE may provide the BS with information on a pattern of the D2D reception subframes that indicates the usage of at least some of the D2D reception subframes. From the pattern, the BS may determine one or more D2D reception subframes in which the UE wants to monitor the D2D reception and/or the cellular reception. Then the BS may avoid scheduling the downlink transmission in the subframes in which the UE monitors the D2D reception. In the other D2D reception subframes, the downlink transmission can be scheduled. In this way, the UE can properly switch between the D2D reception and cellular reception, without any conflicts or downlink resource waste.

17 Claims, 3 Drawing Sheets

(51) Int. Cl.
*H04W 72/02* (2009.01)
*H04W 76/14* (2018.01)
*H04W 72/04* (2009.01)

(58) Field of Classification Search
CPC ......... H04W 72/0406; H04W 72/1257; H04W 72/042; H04L 5/14
See application file for complete search history.

(56) References Cited

U.S. PATENT DOCUMENTS

| | | |
|---|---|---|
| 2012/0113847 A1 | 5/2012 | Narasimha et al. |
| 2013/0322235 A1 | 12/2013 | Khoryaev et al. |
| 2013/0329704 A1* | 12/2013 | Lee ................ H04L 1/1893 370/336 |
| 2014/0003301 A1* | 1/2014 | Madan ................ H04L 5/14 370/280 |
| 2014/0086153 A1 | 3/2014 | Bontu et al. |
| 2014/0148177 A1 | 5/2014 | Ratasuk et al. |
| 2014/0185530 A1 | 7/2014 | Kuchibhotla et al. |
| 2014/0269338 A1* | 9/2014 | Jung ................ H04L 5/0055 370/241 |
| 2014/0341092 A1* | 11/2014 | Chu ................ H04W 72/0446 370/280 |
| 2015/0009910 A1* | 1/2015 | Ryu ................ H04W 72/04 370/329 |
| 2015/0055579 A1* | 2/2015 | Wu ................ H04L 1/1812 370/329 |
| 2015/0230226 A1* | 8/2015 | Yoshizawa ......... H04W 72/042 370/329 |
| 2015/0326362 A1* | 11/2015 | Xiong ................ H04L 5/0048 370/336 |
| 2015/0327180 A1* | 11/2015 | Ryu ................ H04W 52/18 370/329 |
| 2015/0334756 A1* | 11/2015 | Lu ................ H04W 72/042 370/329 |
| 2015/0341816 A1* | 11/2015 | Lee ................ H04L 5/0092 370/252 |
| 2016/0381666 A1* | 12/2016 | Kim ................ H04W 72/0446 370/329 |
| 2017/0006585 A1* | 1/2017 | Jung ................ H04W 48/12 |
| 2017/0048829 A1* | 2/2017 | Kim ................ H04W 76/023 |
| 2017/0295567 A1* | 10/2017 | Chen ................ H04W 4/70 |

FOREIGN PATENT DOCUMENTS

| | | |
|---|---|---|
| CN | 103298120 A | 9/2013 |
| CN | 103368713 A | 10/2013 |
| WO | 2013020257 A1 | 2/2013 |
| WO | 2013137639 A1 | 9/2013 |
| WO | 2014014325 A1 | 1/2014 |

OTHER PUBLICATIONS

Sharp, "Collision Avoidance Mechanism 1-15 with Cellular Network for D2D Communication", 3GPP TSG RAN WG1 Meeting #77, Seoul, Korea, May 19-23, 2014.

Institute for Information Industry, "Resource allocation scheme for in-coverage D2D communication to support Mode 1 and Mode 2", 3rd Generation Partnership Project (3GPP), Mobile Competence Centre, May 18, 2014.

Huawei, et al., "Parameter Configuration for D2D Radio Bearers", 3rd Generation Partnership Project (3GPP), Mobile Competence Centre, May 18, 2014.

"LTE; Evolved Universal Terrestrial Radio Access Network (E-UTRAN); X2 Application Protocol (X2AP)", Published on: Jan. 2012 Available at: http://www.etsi.org/deliver/etsi_ts/136400_136499/136423/10.04.00_60/ts_136423v100400p.pdf.

International Preliminary Report on Patentability Issued in PCT Application No. PCT/US2015/042766, dated Jun. 16, 2016, 7 pages.

"First Office Action Issued in Chinese Patent Application No. 201580038041.2", dated Jul. 31, 2019, 6 Pages.

* cited by examiner

DOWNLINK TRANSMISSION SCHEDULING FOR USER EQUIPMENTS ENABLING DEVICE-TO-DEVICE COMMUNICATIONS

RELATED APPLICATIONS

This application claims priority to Chinese Application No. 201410370921.7, filed on Jul. 31, 2014, and entitled "DOWNLINK TRANSMISSIONS SCHEDULING FOR USER EQUIPMENTS ENABLING DEVICE-TO-DEVICE COMMUNICATIONS." This application claims the benefit of the above-identified application, and the disclosure of the above-identified application is hereby incorporated by reference in its entirety as if set forth herein in full.

BACKGROUND

Major effort has been put in recent years on the development of Third Generation Partnership Project (3GPP) Long Term Evolution (LTE), which provides Evolved Universal Mobile Telecommunications System (UMTS) terrestrial radio access (EUTRA) and EUTRA network (EUTRAN) technology for higher data rates and system capacity. In 3GPP LTE-Advanced (LTE-A) cellular systems, device-to-device (D2D) communication has been proposed to enable the proximity-based service. The D2D communication allows user equipments (UEs) to communicate with each other through a direct connection. In general, the D2D communication operates in uplink spectrum in the case of Frequency Division Duplex (FDD) or uplink subframes of the cell giving coverage. The D2D signals are communicated using Single Carrier Frequency Division Multiple Access (SC-FDMA).

From the perspective of an individual UE, on a given carrier, the D2D signal reception and cellular uplink transmission do not use full duplex. Additionally, it is assumed that D2D transmission/reception does not use full duplex on a given carrier. In cellular FDD system, a UE enabling D2D communications (referred to "D2D UE") may receive the cellular transmission from the base station (BS) in the downlink spectrum and the D2D transmission from other D2D UEs in the associated uplink spectrum. If the UE is equipped with two or more reception chains, the cellular reception and D2D reception may be performed at the same time.

SUMMARY

If the D2D UE is only equipped with a single reception chain, the UE has to switch between cellular reception in the downlink spectrum and the D2D reception in the associated uplink spectrum in a Time Division Multiplexing (TDM) manner. The BS may broadcast the information about the D2D reception subframes, for example, using a system information block (SIB), such that the UE is aware of the subframes to be blindly detected for the D2D reception. Traditionally, the BS does not schedule any downlink transmission in the D2D reception subframes to avoid conflicts. However, the D2D UEs are not always interested in all D2D reception. In other words, the UEs would probably not monitor the D2D reception in some of the D2D reception subframes. This will lead to unnecessary degradation in the downlink performance due to the waste of the downlink resource.

In accordance with embodiments of the subject matter described herein, a D2D UE may determine a pattern of the D2D reception subframes and report the pattern to the serving BS. The pattern indicates the usage of at least some of the D2D reception subframes. According to the pattern, the BS may avoid scheduling downlink transmission to the UE in each D2D reception subframe in which the UE will monitor the D2D reception. For the other D2D reception subframes, the BS may schedule the downlink transmission. In one embodiment, the BS is allowed to modify the subframe pattern reported by the UE, for example, by adding one or more additional D2D reception subframes. In this way, the UE can properly and flexibly switch between the D2D reception and cellular reception, without any conflicts or degradation in the downlink performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Moreover, as described above, a D2D UE refers to a UE enabling the D2D communications.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
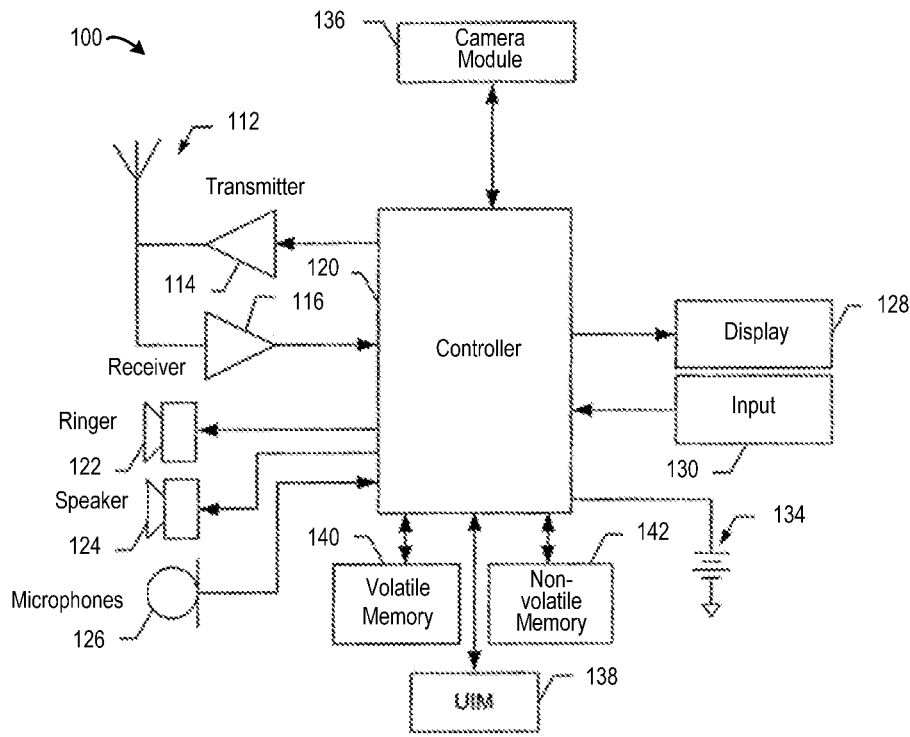
FIG. 1 illustrates a block diagram of user equipment in accordance with one embodiment of the subject matter described herein.

FIG. 1 illustrates a block diagram of a UE 100 in accordance with one embodiment of the subject matter described herein. The UE 100 may be a mobile device with a wireless communication capability. However, it is to be understood that any other types of user devices may also easily adopt embodiments of the subject matter described herein, such as a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

As shown, the UE 100 comprises one or more antennas 112 operable to communicate with the transmitter 114 and the receiver 116. With these devices, the UE 100 may perform cellular communications with one or more BSs. Additionally, the UE 100 may be a D2D UE that supports the D2D communications with one or more other UEs.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

The UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the UE 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
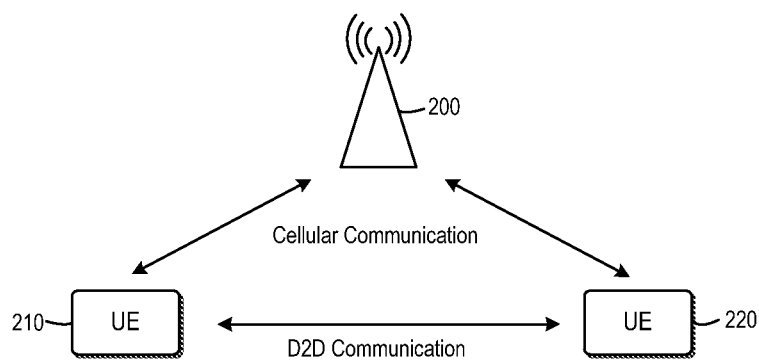
FIG. 2 illustrates a block diagram of an environment in which embodiments of the subject matter described herein may be implemented.

FIG. 2 shows an environment of a cellular system in which embodiments of the subject matter described herein may be implemented. As shown, one or more UEs may communicate with a BS 200. In this example, there are two UEs 210 and 220. This is only for the purpose of illustration without suggesting limitations on the number of UEs. There may be any suitable number of UEs in communication with the BS 200. In one embodiment, the UEs 210 and/or 220 may be implemented by the UE 100 as shown in FIG. 1, for example.

The cellular communications between the UEs 210 and 220 and the BS 200 may be performed according to any appropriate communication protocols including, but not limited to, the first generation (1G), the second generation (2G), 2.5G, 2.75G, the third generation (3G), the fourth generation (4G) communication protocols, and/or any other protocols either currently known or to be developed in the future.

Two or more UEs may perform D2D communications with one another. In the example shown in FIG. 2, only for the purpose of illustration, the UE 210 may work in the D2D reception mode and the UE 220 may work in the D2D transmission mode. At this point, the UE 210 may receive D2D signals from the UE 220 on the uplink spectrum. The D2D signals may include, but are not limited to, D2D synchronization signals (D2DSS), D2D discovery signals, D2D communication signals, and the like.

The resources for the D2D communication may be determined and broadcasted by the BS 200. For example, in one embodiment, the BS 200 may broadcast a resource pool for D2D reception using the system information block (SIB). In one embodiment, considering the support of inter-cell D2D communications, the resource pool for D2D reception may be a superset of the resource pool for D2D transmission in more than one cell. Upon receiving the SIB from the BS 200, the UE 210 is aware of the D2D reception subframes in the uplink spectrum. As used herein, the term "D2D reception subframe" refers to a subframe that is included in the resource pool for D2D reception as determined by the BS 200. Then the UE 210 may monitor the D2D reception in the D2D reception subframes indicated by the SIB.

The UE 210 may also receive the cellular transmission from the BS 200 in the associated downlink spectrum. In the case that the UE 210 has only one reception chain available, the UE 210 has to switch between the uplink and downlink spectrum for the D2D reception and cellular reception, respectively. Traditionally, the BS 200 assumes that the UE 210 monitors the D2D reception in each D2D reception subframe. As a result, the BS 200 avoids scheduling any downlink transmission in those subframes. However, it is possible that the UE 210 does not monitor D2D reception in one or more D2D reception subframes indicated by the SIB. In this event, due to the waste of those D2D reception subframes, the downlink performance for the UE 210 will be degraded.

Figures 3, 4:
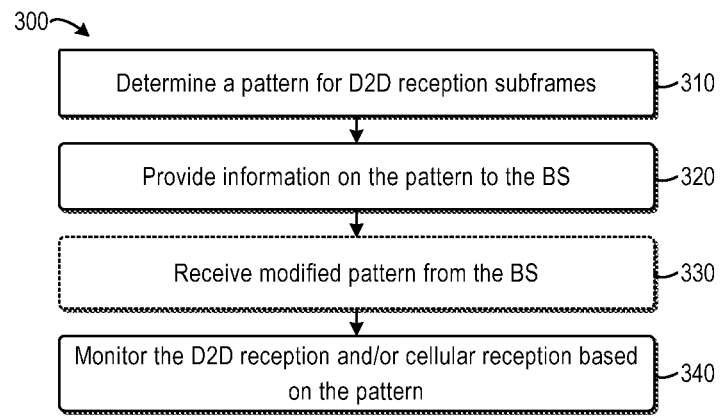
FIG. 3 illustrates a flowchart of a method for monitoring D2D and/or cellular reception at a D2D UE according to a subframe pattern in accordance with one embodiment of the subject matter described herein.
FIG. 4 illustrates a schematic diagram of a Time Division Duplex (TDD)-like uplink/downlink configuration serving as the subframe pattern in accordance with one embodiment of the subject matter described herein.

FIG. 3 shows the flowchart of a method 300 for monitoring D2D and/or cellular reception at a D2D UE according to a subframe pattern in accordance with one embodiment of the subject matter described herein. The method 300 may be at least in part implemented by the UE 210 that works in the D2D reception mode, for example.

The method 300 is entered at step 310, where a pattern for the D2D reception subframes is determined As discussed above, the D2D reception subframes are included in the resource pool for D2D reception which may be broadcasted by the BS 200, for example, using the SIB. That is, according to the initial configuration of the BS 200, the subframes included in the resource pool are all reserved for the D2D reception. Specifically, it is known that if the UE 210 is in an idle mode, it needs to monitor some downlink subframes, such as the subframes 0, 4, 5 and 9, for paging detection. Therefore, in one embodiment, the BS 200 may ensure that those subframes for paging detection are not configured as the D2D reception subframes in the uplink spectrum.

As discussed above, the UE 210 often has no interest in some of the D2D reception subframes. In other words, the UE 210 will not monitor the D2D reception in these subframes. In accordance with embodiments of the subject matter described herein, the UE 210 may use the subframe pattern to indicate its "interest" in the D2D reception subframes. As used herein, the term "pattern" refers to any indicator that indicates the usage of the D2D reception subframes. In one embodiment, the pattern may indicate the usage of some or all of the D2D reception subframes. For example, in one embodiment, the UE 210 may use the pattern to indicate one or more D2D reception subframes that are to be used for the D2D reception. Alternatively or additionally, the UE 210 may use the pattern to indicate one or more D2D reception subframes that are to be used for the cellular downlink reception.

The pattern may be implemented in various different ways. For example, in one embodiment, at step 310, the UE 210 may generate an indicator (referred to as "the first indicator") that indicates a set (referred to as "the first set") of the D2D reception subframes. The first set includes one or more D2D reception subframes to be excluded from the cellular reception. In other words, in this embodiment, the UE 210 may inform the BS 200 not to schedule any downlink cellular transmission in those subframes as indicated in the pattern.

For example, in one embodiment, the indicator may be implemented as a bitmap. By way of example, suppose that the D2D signals transmitted in the period of 40 ms which is indicated in SIB for broadcasting the resource pool. At step 310, a bitmap with length of 40 may be generated by the UE 210 according to the resource pool for D2D reception and the interested D2D transmission. Only for the purpose of illustration, in the bitmap, marks "0" may be used to indicate that the associated D2D reception subframes will be used for the D2D reception and marks "1" indicate that the associated D2D reception subframes can be used for the cellular reception, or vice versa.

It is to be understood that the subject matter described herein is not limited to the use of bitmap. Any other suitable indicators can be used to indicate the usage of one or more D2D reception subframes. Examples of the indicators include, but are not limited to, numerals, reference characters, symbols, or any combination thereof Alternatively, in one embodiment, the UE 210 may generate an indicator (referred to as "the second indicator") that indicates a set (referred to as "the second set") of the D2D reception subframes. The subframes included in the second set are confirmed to be used for the D2D reception. In this way, the UE 210 may inform the BS 200 of the interested D2D reception subframes. By way of example, in one embodiment where the second indicator is implemented as a bitmap, marks "0" means that the associated D2D reception subframes are interested subframes in which the UE 210 will monitor the D2D reception, while "1" means not. In one embodiment, the pattern may be a subset of the initial D2D reception subframes included in the resource pool for D2D reception that is broadcasted by the BS 200. Once again, in addition to or instead of the bitmap, the UE 210 may use any other suitable indicators to indicate the D2D reception subframes to be used for the D2D reception.

In still another embodiment, at step 310, the pattern may be generated as a TDD-like uplink/downlink configuration. Generally, it is possible to define a plurality of uplink/downlink configurations, each of which specifies a resource ratio between the cellular reception and D2D reception. In this way, any uplink/downlink configuration may indicate the usage of the D2D reception subframes. More specifically, the uplink/downlink configuration may at least indicate a set (referred to as "the third set") of the D2D reception subframes to be used for the downlink cellular reception.

In one embodiment, for each of the D2D reception subframes, the uplink/downlink configuration may indicate whether this subframe is to be used as a downlink subframe or uplink subframe. If the D2D reception subframe is indicated as a downlink subframe, it can be used for the cellular reception at the UE 210. By way of example, FIG. 4 shows a schematic diagram of an example of TDD uplink/downlink configurations. For example, the configuration 2 ("Conf#2") provides the ratio of 8:2 between the downlink and uplink resources and the frame structure is "DSUDDDSUDD". If the UE 210 selects the configuration 2 at step 310, it means that the UE 210 will monitor the D2D reception only in the subframes 2 and 7. The other D2D reception subframes 0, 1, 3, 4, 5, 6, 8 and 9 can be used for the cellular reception.

It is to be understood that in addition to or instead of the uplink/downlink configurations shown in FIG. 4, any suitable configurations can also be defined to reflect different resource ratio between the D2D reception and cellular reception. For example, an uplink/downlink configuration does not necessarily indicate the usage of every subframe. Instead, in one embodiment, the uplink/downlink configuration may only indicate the downlink subframes or uplink subframes.

In addition, it is to be understood that the above example embodiments are only for the purpose of illustration, without suggesting any limitations on the subject matter described herein. The pattern for the D2D reception subframes may be implemented in any other suitable forms as long as it is capable of indicating the UE's preference on the usage of the D2D reception subframes.

Still with reference to FIG. 3, the method 300 proceeds to step 320 to provide information on the generated pattern for the D2D reception subframes to the serving BS 200, such that the BS 200 can schedule cellular transmission to the UE 210 based on the pattern. The pattern may be provided according to any appropriate timing For example, in one embodiment, the UE 210 may report the pattern to the BS 200 during the Radio Resource Control (RRC) connection or reconnection establishment procedure.

In one embodiment, the UE 210 may provide the pattern itself to the BS 200. Alternatively, the UE 210 may transmit to the BS 200 an index, identifier or any other information that can uniquely identify the pattern. For example, in one embodiment where the uplink/downlink configurations serve as the pattern, such configurations may be defined in advance and known to both the UE 210 and the BS 200. In this embodiment, the UE 210 only needs to transmit an index of the selected uplink/downlink configuration to the BS 200. The BS 200 may determine the pattern selected by the UE 210 and schedule the downlink transmission to the UE 210 accordingly.

In one embodiment, at step 330, the UE 210 may receive information on a modified subframe pattern. In this embodiment, upon receipt of the pattern provided by the UE 210, the BS 200 may modify or update the pattern and then send information on the modified pattern back to the UE 210, which will be discussed below. Accordingly, the UE 210 replaces the initial pattern with the modified one determined by the BS 200. It is to be understood that step 330 is optional. For example, in one embodiment, the BS 200 may directly adopt the pattern that is generated and provided by the UE 210 and step 330 can be omitted.

Then the method 300 proceeds to step 340 where the UE 210 monitors the D2D reception from other D2D UEs (for example, the UE 220) and/or the cellular reception from the BS 200 based on the pattern for the D2D reception subframes. Specifically, if the BS 200 does not modify the generated pattern, the UE 210 may monitor the D2D reception and cellular reception according to the initial pattern generated at step 310. On the other hand, if the BS 200 has modified the initial pattern, the UE 210 may monitor the D2D reception and cellular reception according to the modified pattern which is received from the BS 200 at step 330.

For example, in the embodiment where the pattern is implemented as the first or second indicator as described above, the UE 210 may monitor the D2D reception in the D2D reception subframes indicated by the pattern and monitor the cellular downlink reception in the other D2D reception subframes. As another example, in the embodiment where the pattern is implemented as the TDD uplink/downlink configuration like the one shown in FIG. 4, the UE 210 may monitor the cellular downlink reception only in the downlink subframes indicated in the configuration and monitor the D2D reception in the uplink subframes.

In this way, at least some of the D2D reception subframes initially configured by the BS can be used for cellular downlink reception if the UE indicates in the pattern that those subframes will not be used for the D2D reception. Compared with the convention solutions where the BS entirely mutes the downlink transmission in the D2D reception subframes, the downlink performance of the UE may be significantly improved. Even if the UE is only equipped with a single reception chain, the UE may have improved downlink performance by properly switching between the cellular downlink reception and D2D reception. Additionally, there is no any impact on the UE in idle mode since it is only necessary to insert a pattern, for example, during the RRC connection/reconnection.

Figure 5:
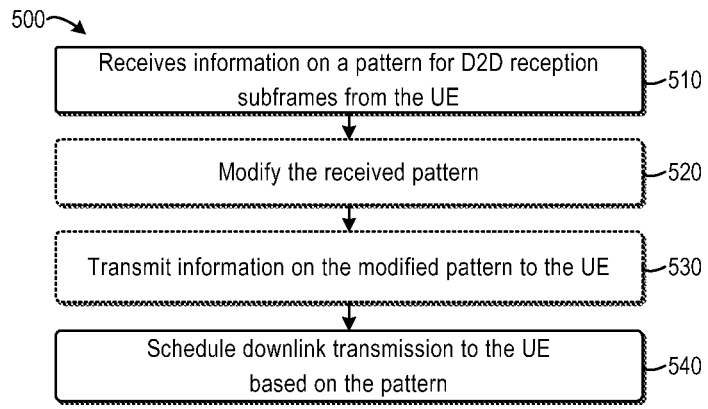
FIG. 5 illustrates a flowchart of a method for scheduling downlink transmission to a D2D UE according to a subframe pattern in accordance with one embodiment of the subject matter described herein.

FIG. 5 shows the flowchart of a method 500 for scheduling downlink transmission to a D2D UE based on a subframe pattern in accordance with one embodiment of the subject matter described herein. The method 500 may be at least in part implemented by a BS (for example, the BS 200) in the cellular system.

The method 500 is entered at step 510, where the BS 200 receives information on a pattern for D2D reception subframes from a UE (for example, the UE 210). As described above, the pattern may indicate the usage of at least some of the D2D reception subframes that are included in the resource pool for D2D reception. The pattern may be in the form of, for example, the first indicator, the second indicator, or the TDD uplink/downlink configuration, as described above. Additionally, the received information may contain the pattern itself and/or any information that can identify the pattern that is determined by the UE 210. By way of example, in one embodiment, the information on the pattern may be received during the RRC connection/reconnection establishment procedure. Of course, the pattern may be transmitted to the BS 200 according to any other suitable timing.

In one embodiment, the resource pool for D2D reception is configured and broadcasted by the BS 200. For example, the resource pool for D2D reception and possibly other resource pools may be broadcasted in the SIB. Specifically, considering the fact that the UE in idle mode may detect paging in some subframes like subframes 0, 4, 5 and 9, in one embodiment, the BS 200 may determine the resource pool for D2D reception such that no subframe for paging detection is scheduled as a D2D reception subframe.

In one embodiment, at step 520, the BS 200 may modify the received pattern. For example, in one embodiment, the BS 200 may check the preferred pattern as indicated by the UE 210 and decide whether to add additional D2D reception subframes to the UE. For example, the UE 200 may make its decision based on the configuration or status of the available D2D resource, cellular resource, and/or any other relevant factors. In this way, the usage of the D2D reception subframes may be more adapted to the current status of the cellular system.

Then the BS 200 may transmit information on the modified pattern to the UE 210 at step 530. Once again, the BS 200 may transmit the modified pattern per se or the information that can identify the modified pattern. As described above, upon receipt of the modified pattern, the UE 210 will replace the initial pattern with the modified pattern in order to monitor the D2D reception and/or cellular downlink reception according to the modified pattern.

It is to be understood that steps 520 and 530 are optional. For example, in one embodiment, the BS 200 may accept the pattern indicated by the UE 210 without any modification. In this embodiment, steps 520 and 530 can be omitted. Optionally, in one embodiment, the BS 200 may transmit a confirmation to the UE 210 to indicate the receipt of the subframe pattern.

The method 500 proceeds to step 540, where the BS 200 schedules the downlink transmission to the UE 210 based on the pattern for the D2D reception subframes. Specifically, if the received pattern is not modified, the scheduling of the downlink transmission is performed according to the initial pattern determined by the UE 210. Otherwise, the downlink transmission may be scheduled according to the pattern that is modified by the BS 200 at step 520.

As described above, in one embodiment, the pattern may be an indicator such as a bitmap indicating a set of the subframes to be excluded from cellular reception at the UE 210. For example, marks "0" in the bitmap may be used to indicate that the associated D2D reception subframes will be used for the D2D reception and marks "1" may be used to indicate that the associated D2D reception subframes can be used for the cellular reception. In this embodiment, at step 540, the BS 200 will not schedule downlink transmission or uplink transmission in those D2D reception subframes marked with "0" in the pattern.

Alternatively, in one embodiment, the pattern may be implemented as an indicator such as a bitmap that indicates a set of the subframes to be used for the D2D reception at the UE 210. For example, in the bitmap, marks "0" may be used to indicate that the associated subframes are interested D2D reception subframes while "1" means not. In this embodiment, at step 540, the BS 200 will not schedule downlink transmission or uplink transmission in those subframes corresponding to "0" in the pattern.

In another embodiment, the pattern may be implemented as the uplink/downlink configuration. In this embodiment, at step 540, the BS 200 schedules downlink transmission to the UE 210 only in the downlink subframes as indicated in the selected uplink/downlink configuration. The other subframes will be used for the D2D reception by the UE 210. Specifically, in one embodiment, the special subframes may also be considered as downlink subframes. For instance, in the example shown in FIG. 4, when the configuration 2 is selected, the BS 200 may schedule transmission to the UE 210 in the special subframes 1 and 6.

Figure 6:
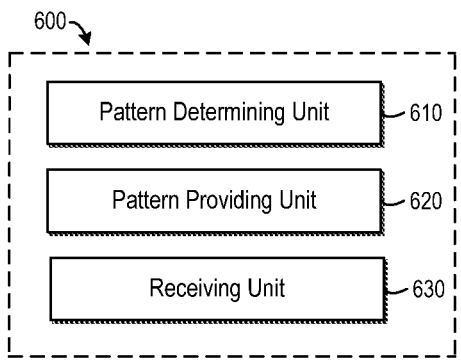
FIG. 6 illustrates a block diagram of an apparatus for monitoring D2D and/or cellular reception according to a subframe pattern in accordance with one embodiment of the subject matter described herein.

FIG. 6 shows a block diagram of an apparatus 600 for monitoring D2D and/or cellular reception according to a subframe pattern in accordance with one embodiment of the subject matter described herein. As shown, the apparatus 600 comprises a pattern determining unit 610 configured to determine a pattern for subframes included in a resource pool for device-to-device (D2D) reception, the pattern indicating usage of at least some of the subframes; a pattern providing unit 620 configured to provide information on the pattern to a base station; and a receiving unit 630 configured to monitor at least one of D2D reception and cellular reception in the subframes based on the pattern.

In one embodiment, the pattern determining unit 610 may comprise a first indicator determining unit configured to determine a first indicator that indicates a first set of the subframes to be excluded from the cellular reception. Alternatively or additionally, in one embodiment, the pattern determining unit 610 may comprise a second indicator determining unit configured to determine a second indicator that indicates a second set of the subframes to be used for the D2D reception. Alternatively or additionally, in one embodiment, the pattern determining unit 610 may comprise a configuration determining unit configured to determine an uplink/downlink configuration at least indicating a third set of the subframes to be used for the cellular reception.

In one embodiment, the pattern providing unit 620 is configured to provide the information on the pattern in the RRC connection or reconnection establishment procedure.

In one embodiment, the apparatus 600 may further comprise a modified pattern receiving unit configured to receive, from the base station, information on a modified pattern for the subframes, where the modified pattern is determined by the base station based on the pattern. In this embodiment, the receiving unit 630 may be configured to monitor at least one of the D2D reception and the cellular reception in the subframes according to the modified pattern.

Figure 7:
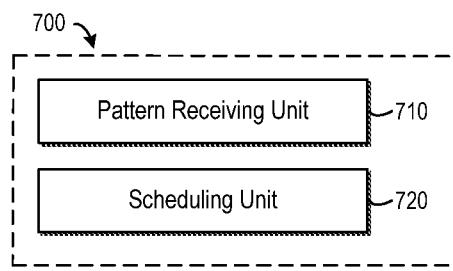
FIG. 7 illustrates a block diagram of an apparatus for scheduling downlink transmission to the UE according to a subframe pattern in accordance with one embodiment of the subject matter described herein.

FIG. 7 shows a block diagram of an apparatus 700 for scheduling cellular transmission to the UE based on the subframe pattern in accordance with embodiments of the subject matter described herein. In one embodiment, the apparatus 700 may be the BS 200, for example. As shown, the apparatus 700 comprises a pattern receiving unit 710 configured to receive, from user equipment, information on a pattern for subframes included in a resource pool for device-to-device (D2D) reception, the pattern indicating usage of at least some of the subframes; and a scheduling unit 720 configured to schedule cellular transmission to the user equipment based on the pattern.

In one embodiment, the pattern receiving unit 710 is configured to receive information on a first indicator that indicates a first set of the subframes to be excluded from cellular reception at the user equipment. In this embodiment, the scheduling unit 720 is configured to exclude the first set of the subframes from being scheduled for the cellular transmission to the user equipment.

In one embodiment, the pattern receiving unit 710 is configured to receive information on a second indicator that indicates a second set of the subframes to be used for D2D reception at the user equipment. In this embodiment, the scheduling unit 720 is configured to exclude the second set of the subframes from being scheduled for the cellular transmission to the user equipment.

In one embodiment, the pattern receiving unit 710 is configured to receive information on an uplink/downlink configuration at least indicating a third set of the subframes to be used for cellular reception at the user equipment. In this embodiment, the scheduling unit 720 is configured to schedule the cellular transmission to the user equipment in the third set of the subframes.

In one embodiment, the pattern receiving unit 710 is configured to receive the information on the pattern in the RRC connection or reconnection establishment procedure.

In one embodiment, the apparatus 700 further comprises a pattern modifying unit and a modified pattern transmitting unit. The pattern modifying unit is configured to modify the received pattern. The modified pattern transmitting unit is configured to transmit information on the modified pattern to the user equipment. In this embodiment, the scheduling unit 720 is configured to schedule the downlink transmission according to the modified pattern.

In one embodiment, the apparatus 700 may further comprise a resource determining unit configured to determine the resource pool for D2D reception, such that subframes for paging detection when the user equipment is in an idle mode are excluded from the resource pool. In this embodiment, the apparatus 700 may further comprise a resource broadcasting unit configured to broadcast the resource pool in a SIB.

The units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method implemented at least in part by a user equipment comprising:
   receiving, at the user equipment via cellular communication from a base station, a resource pool consisting of a plurality of subframes, the plurality of subframes designated for device-to-device (D2D) reception with at least one other user equipment;
   generating an initial pattern for the plurality of subframes at the user equipment, the initial pattern indicating cellular reception usage of a subset of the plurality of subframes that were initially configured by the base station for D2D reception, wherein generating the initial pattern includes generating a bitmap that indicates a set of the plurality of subframes to be excluded from the cellular reception;
   providing information on the initial pattern for the plurality of subframes to the base station;
   receiving, from the base station, information on a modified pattern for the plurality of subframes, the modified pattern being determined by the base station based on modifying the initial pattern, wherein the modified pattern determined by the base station is based on modifying the bitmap; and
   monitoring, at the user equipment, at least one of D2D reception from the at least one other user equipment and cellular reception from the base station in the plurality of subframes based on the modified pattern.

2. The method of claim 1, wherein generating the initial pattern comprises:
   generating an indicator that indicates a set of the plurality of subframes to be used for the D2D reception.

3. The method of claim 1, wherein generating the initial pattern comprises:
   generating a Time Division Duplex (TDD) uplink/downlink configuration that at least indicates a set of the plurality of subframes to be used for the cellular reception.

4. The method of claim 1, wherein providing the information on the initial pattern comprises:
   providing the information on the initial pattern in a Radio Resource Control (RRC) connection establishment procedure.

5. The method of claim 1, wherein providing the information on the initial pattern comprises:
   providing the information on the initial pattern in a reconnection establishment procedure.

6. The method of claim 1, wherein the modified pattern being determined by the base station is based on modifying the initial pattern to include additional D2D reception subframes.

7. The method of claim 1, wherein the modified pattern being determined by the base station is further based on a configuration or a status of available D2D resources or cellular resources such that the modified pattern is more adapted than the initial pattern to a current status of a cellular system.

8. A method implemented at least in part by a base station comprising:
   sending, to a user equipment, a resource pool consisting of a plurality of subframes, the plurality of subframes designated for device-to-device (D2D) reception with at least one other user equipment;
   receiving, from the user equipment, information on an initial pattern for the plurality of subframes, the initial pattern indicating cellular reception usage of a subset of the plurality of subframes that were initially configured by the base station for D2D reception, wherein receiving information on the initial pattern for the plurality of subframes includes receiving a bitmap that indicates a set of the plurality of subframes to be excluded from the cellular reception;

determining, at the base station, a modified pattern for the plurality of subframes based on modifying the initial pattern, wherein determining the modified pattern for the plurality of subframes is based on modifying the bitmap;

sending, to the user equipment, information on the modified pattern for the plurality of subframes; and scheduling cellular transmission from the base station to the user equipment based on the modified pattern.

9. The method of claim 8, wherein sending the information on the modified pattern comprises sending information on the modified bitmap that indicates a second set of the plurality of subframes to be excluded from cellular reception at the user equipment, and wherein the scheduling comprises excluding the second set of the plurality of subframes from being scheduled for the cellular transmission to the user equipment.

10. The method of claim 8, wherein sending the information on the modified pattern comprises sending information on an indicator that indicates a set of the plurality of subframes to be used for D2D reception at the user equipment, and wherein the scheduling comprises excluding the set of the plurality of subframes from being scheduled for the cellular transmission to the user equipment.

11. The method of claim 8, wherein sending the information on the modified pattern comprises sending information on a Time Division Duplex (TDD) uplink/downlink configuration that at least indicates a set of the subframes to be used for cellular reception at the user equipment, and wherein the scheduling comprises scheduling the cellular transmission to the user equipment in the set of the subframes.

12. The method of claim 8, wherein receiving the information on the initial pattern comprises:

receiving the information on the initial pattern in a Radio Resource Control (RRC) connection or a reconnection establishment procedure.

13. The method of claim 8, further comprising:

determining the resource pool for D2D reception, such that subframes for paging detection, when the user equipment is in an idle mode, are excluded from the resource pool for D2D reception; and broadcasting the resource pool for D2D reception in a system information block (SIB).

14. The method of claim 8, wherein the determining the modified pattern based on the initial pattern comprises adding D2D reception subframes.

15. A user equipment comprising:

a controller configured to receive, via cellular communication from a base station, a resource pool consisting of a plurality of subframes designated for device-to-device (D2D) reception from at least one other user equipment;

the controller further configured to generate an initial pattern for the plurality of subframes, the initial pattern including information indicating cellular reception usage of a subset of the plurality of subframes that were initially configured by the base station for D2D reception, wherein the controller is configured to generate the initial pattern by generating a bitmap that indicates a set of the plurality of subframes to be excluded from the cellular reception;

a transmitter configured to transmit information on the initial pattern to the base station via cellular communication; and a receiver configured to receive, from the base station, information on a modified pattern for the plurality of subframes, the modified pattern being a pattern generated by the base station based on modifying the initial pattern to include more D2D reception subframes than the initial pattern, the receiver further configured to monitor at least one of D2D reception from the at least one other user equipment and cellular reception from the base station in the plurality of subframes based on the modified pattern, wherein the modified pattern determined by the base station is based on modifying the bitmap.

16. The user equipment of claim 15, wherein the controller is configured to generate the initial pattern including an indicator that indicates a set of the plurality of subframes to be used for the D2D reception.

17. The user equipment of claim 15, wherein the controller is configured to generate a Time Division Duplex (TDD) uplink/downlink configuration that at least indicates a set of the subframes to be used for the cellular reception.

* * * * *